US010056758B2

(12) United States Patent
Unru et al.

(10) Patent No.: US 10,056,758 B2
(45) Date of Patent: Aug. 21, 2018

(54) METHOD AND INVERTER FOR DISTRIBUTING POWER AMONG A PLURALITY OF DC SOURCES CONNECTED JOINTLY TO A DC VOLTAGE INPUT OF A DC-TO-AC CONVERTER

(71) Applicant: SMA Solar Technology AG, Niestetal (DE)

(72) Inventors: Alexander Unru, Niestetal (DE); Thomas Schroeder, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 446 days.

(21) Appl. No.: 14/812,090

(22) Filed: Jul. 29, 2015

(65) Prior Publication Data
US 2015/0340869 A1    Nov. 26, 2015

Related U.S. Application Data

(63) Continuation of application No. PCT/EP2014/051241, filed on Jan. 22, 2014.

(30) Foreign Application Priority Data

Jan. 30, 2013  (DE) .................. 10 2013 100 961
May 24, 2013  (DE) .................. 10 2013 105 339

(51) Int. Cl.
*H02J 1/00* (2006.01)
*H02J 3/00* (2006.01)
(Continued)

(52) U.S. Cl.
CPC .............. *H02J 3/383* (2013.01); *H02J 1/102* (2013.01); *H02J 3/385* (2013.01); *H02M 3/04* (2013.01);
(Continued)

(58) Field of Classification Search
CPC ............ H02J 3/383; H02J 1/102; H02J 3/385; H02M 3/04; H02M 7/42; Y10T 307/707
See application file for complete search history.

(56) References Cited

U.S. PATENT DOCUMENTS 8,508,074 B2 *   8/2013   Shenoy ............. H01L 31/02021
                                                          307/77
2005/0225090 A1 *  10/2005  Wobben .................... F03D 9/00
                                                          290/44
(Continued)

FOREIGN PATENT DOCUMENTS

DE    102012101928 A1    3/2011
EP        2528181 A1    11/2012
(Continued)

*Primary Examiner* — Rexford Barnie
*Assistant Examiner* — Rasem Mourad
(74) *Attorney, Agent, or Firm* — Eschweiler & Potashnik, LLC

(57) ABSTRACT

In order to distribute power over multiple direct current sources which are connected in parallel to an input-side direct voltage intermediate circuit of a DC/AC transformer, at least one of which direct current sources is connected to the direct voltage intermediate circuit via a DC/DC transformer, wherein the DC/DC transformer can be actuated to change the power fed into the direct voltage intermediate circuit by the direct current source, the power levels of the direct current sources are decreased differently in a decreased operating mode of the DC/AC transformer in which the power of the DC/AC transformer is decreased compared to the sum of the maximum power levels available from all the direct current sources, and by actuating at least the one DC/DC transformer via which the at least one direct current source is connected to the direct voltage intermediate circuit, variation in the power levels of at least one other direct current source is compensated dynamically.

18 Claims, 4 Drawing Sheets

(51) Int. Cl.
  *H02J 3/38*    (2006.01)
  *H02M 7/42*    (2006.01)
  *H02M 3/04*    (2006.01)
  *H02J 1/10*    (2006.01)

(52) U.S. Cl.
  CPC .............. *H02M 7/42* (2013.01); *Y02E 10/58* (2013.01); *Y10T 307/707* (2015.04)

(56) References Cited

U.S. PATENT DOCUMENTS

| | | | |
|---|---|---|---|
| 2009/0147554 A1* | 6/2009 | Adest | G01S 3/7861 363/71 |
| 2009/0236917 A1 | 9/2009 | Bettenwort et al. | |
| 2010/0133904 A1* | 6/2010 | Klodowski | H02M 7/48 307/24 |
| 2011/0006609 A1 | 1/2011 | Loh et al. | |
| 2011/0035070 A1 | 2/2011 | Kanai | |
| 2011/0101784 A1 | 5/2011 | Lopez | |
| 2011/0204878 A1 | 8/2011 | Thorngreen et al. | |
| 2013/0002031 A1 | 1/2013 | Mulkey et al. | |
| 2013/0049478 A1* | 2/2013 | Wagoner | H02M 1/36 307/82 |
| 2013/0181531 A1* | 7/2013 | Deboy | H02J 3/385 307/82 |
| 2013/0200709 A1* | 8/2013 | Kirchner | H01L 31/02021 307/77 |
| 2013/0300196 A1* | 11/2013 | Clark | H02J 4/00 307/26 |

FOREIGN PATENT DOCUMENTS

| | | |
|---|---|---|
| JP | H0846231 A | 2/1996 |
| JP | 2012222908 A | 11/2012 |
| WO | 2012017068 A2 | 2/2012 |

* cited by examiner

METHOD AND INVERTER FOR DISTRIBUTING POWER AMONG A PLURALITY OF DC SOURCES CONNECTED JOINTLY TO A DC VOLTAGE INPUT OF A DC-TO-AC CONVERTER

CROSS REFERENCE TO RELATED APPLICATION

This application claims priority to International Patent Application number PCT/EP2014/051241, filed on Jan. 22, 2014, which claims priority to German Patent Application number 10 2013 100 961.1, filed on Jan. 30, 2013, and German Patent Application number 10 2013 105 339.4, filed on May 24, 2013, and is hereby incorporated in their entirety.

FIELD

The disclosure relates to a method for distributing power among a plurality of DC sources, which are connected in parallel to an input-side DC link of a DC-to-AC converter. Furthermore, the disclosure relates to an inverter, which has a DC-to-AC converter comprising an input-side DC link, a plurality of inputs for a parallel connection of a plurality of DC sources to the DC link, and at least one DC-to-DC converter, which is arranged between one of the plurality of inputs and the DC link and is actuable in order to cause a change in the power fed via said DC-to-DC converter into the DC link.

BACKGROUND

A known multistring inverter is the product "Sunny TriPower" by the Applicant. The plurality of DC-to-DC converters of a multistring inverter make it possible to operate the strings connected via said DC-to-DC converters in each case independently of one another at their maximum power point (MPP), i.e. at the operating voltage at which the maximum electric power is generated by the strings. In this case, the DC-to-DC converters are typically boost converters, which step up the operating voltage of the individual strings to the DC-link voltage of a common DC link, which is an input DC link of the DC-to-AC converter. In the case of the product "Sunny TriPower", the deration of the power of a string always takes place in the direction of its off-load voltage. In this case, first the string with the greatest voltage difference between its operating voltage and the DC-link voltage is relieved of load in the event of deration of the power of the DC-to-AC converter, so that its operating voltage increases in the direction of its off-load voltage. Only when this string has been completely relieved of load or when the voltage difference is equal to the voltage difference for a second string is the second string also relieved of load. As a result, minimization of the power losses in the individual DC-to-DC converters in the form of boost converters is achieved, as well as adjustment of their power losses. As already explained, the shift in the operating voltage in the case of inverters of this type always takes place in the direction of the off-load voltage of the individual strings. Therefore, when the installation is dimensioned, it is necessary to ensure that the maximum off-load voltage of the strings does not exceed the maximum permissible DC-link voltage.

In a known version of the multistring inverter "Sunnyboy" by the Applicant, the possibility is provided to the installation operator to extend the range of the possible operating voltages of the strings. In order that the DC-link voltage does not exceed its maximum permissible value nevertheless, in the case of deration of the power of the DC-to-AC converter the operating voltage is shifted in the direction of a short circuit of the respective string, i.e. from the MPP towards lower voltages. This makes it possible to design the strings in such a way that the maximum MPP voltage is approximately equal to the maximum permissible DC-link voltage. Specifically, during control of this known multistring inverter, even prior to the connection of the strings to form a common DC link, it is detected whether a voltage-extending string, i.e. a string with an off-load voltage above the maximum permissible DC-link voltage, is present. Run up of the MPP of such a string is then performed from the range of low operating voltages of the string; and, during deration of the power of the DC-to-AC converter, such a string is operated at reduced operating voltages. Other strings which are not voltage-extending are shifted, during the deration, towards higher operating voltages, i.e. towards their off-load voltage, on the other hand, because a better, in particular quicker deration capacity of the power thereof is provided in this direction owing to the profile of the characteristics of the strings. If a string which initially is not voltage-extending becomes voltage-extending nevertheless owing to changed operating conditions, i.e. for example during deration of its power by increasing its operating voltage in the direction of its off-load voltage, an operating voltage above the permissible DC-link voltage is achieved, the operating voltage of the affected string and possibly substrings connected in parallel to said string and connected to the same DC-to-DC converter is short-circuited, as a result of which a further increase in the DC-link voltage is prevented. Then, the power fed in by the multistring inverter needs to be run up again. As a result, losses during feeding occur since the currently permissible power of the DC-to-AC converter can only be fed again after a few seconds in the case of renewed run up owing to a maximum increase in the power ramp. In general, it is of interest to exhaust the power which can presently be fed by the DC-to-AC converter as much as possible.

US 2011/0101784 A1 discloses a hybrid wind and solar inverter. In this case, power is fed to an electrical grid from alternative voltage sources. Depending on the demand for electric power on the grid, the electric power from the individual voltage sources is connected to the grid or buffer-stored.

EP 2 284 382 A2 discloses an energy supply system, in which electrical energy which is provided by various voltage sources on a power bus is consumed locally or is buffer-stored in the form of heat.

EP 2 104 200 A1 discloses a method for actuating a multistring inverter for photovoltaic systems, which multistring inverter has a separate DC-to-DC converter on the input side for each string. In order to improve efficiency, one or more electrical variables, to be precise input current, input voltage and/or input power, are measured at each DC-to-DC converter, and at least one of the DC-to-DC converters changes its operating state in the event that a limit value and/or a window is exceeded, depending on this measurement, in such a way that its power losses are reduced. For example, the DC-to-DC converter can be disconnected when a boosting of the operating voltage of the string connected thereto, initiated by it, is no longer required because the operating voltage reaches the DC-link voltage.

WO 2012/017068 A2 discloses a method for detecting a feed-in energy quantity, which has been potentially possible but has not actually been fed in within a time period, of a photovoltaic system comprising one or more inverters for feeding electrical energy from one or more photovoltaic generators into an AC grid. Said method is intended in particular for detecting the feed-in power which has been potentially possible during deration. In order to enable this detection, the inverter(s) is/are operated differently during the deration, wherein the different operating modes comprise operation at the MPP or at least for detecting the characteristic of the strings connected to the respective inverter. Specifically, one or more inverters can each be operated at the MPP, and the power of the other inverters can be reduced more significantly in order to achieve the desired deration than if the deration were to be distributed uniformly among all of the inverters. In another specific embodiment of the known method, the characteristics of the string(s) connected to the inverter is sampled regionally or completely, and the thus varying power of the inverter is buffer-stored or compensated for at different times, so that the required power reduction, when averaged over time, is achieved. The demands placed on the deration of the electric power and in particular on the provision of negative deration power do not permit short-term overshooting with the electric power provided by an inverter either, however. In order to feed a constant electric power despite the variable electric power of the inverter, WO 2012/017068 A2 proposes buffer-storing the difference between the different electric power and the constant electric power or converting it into other forms of energy. For this purpose, however, additional devices are then required.

SUMMARY

The disclosure is based on the problem of disclosing a method for controlling an inverter which simplifies utilization of the maximum power that can be fed without additional complexity in terms of apparatus.

The disclosure proposes providing a method for distributing power among a plurality of DC sources, which are connected in parallel to an input-side DC link of a DC-to-AC converter. At least one of the DC sources is connected, via a DC-to-DC converter, to the DC link, wherein the DC-to-DC converter is actuable in order to cause a change in the power fed into the DC link by the DC source. During derated operation of the DC-to-AC converter, in which the power of the DC-to-AC converter is derated with respect to the sum of the maximum powers available from all DC sources, the powers of the DC sources are derated differently, and, by actuation of at least the at least one DC-to-DC converter via which the at least one DC source is connected to the DC link, a variation in the power of at least one other DC source is compensated for dynamically.

Why the variation in the power of the at least one other DC source occurs is in principle irrelevant even if embodiments of the present disclosure actively bring about such variations. The fact that the variation is compensated for dynamically means that, by actuation of the at least one DC-to-DC converter, the power fed into the DC link by the at least one DC source is increased or decreased to such an extent that the power fed into the DC link in total from the at least one DC source and the at least one other DC source follows an external preset, without any buffer-storing of power which goes beyond the effects of a conventional DC-link capacitor, and is constant for this purpose, for example. This is equivalent to any power increase of individual DC sources being compensated for by a corresponding power reduction of the remaining DC sources. Therefore, a balancing equation of the following form results with the changes in power over time $\partial P_i/\partial t$ of a single DC source:

$$\sum_{i=1}^{n} \frac{\partial P_i}{\partial t} = 0,$$

where the sum goes beyond the number n of all of the DC sources of the inverter. This balancing equation applies in particular to a narrow time scale, with the result that ripple of the DC-link voltage is kept as low as possible. In this case, the ripple of the DC-link voltage is lower the shorter the response time of the remaining DC sources or the DC-to-DC converters via which said DC sources feed their powers into the DC link to the change in power of a specific DC source.

The precondition for this is therefore that the power fed into the common DC link always corresponds to the power which can flow at that time as a maximum via the DC-to-AC converter, in particular into an AC grid which is intended to be stabilized with the aid of the deration of the DC-to-AC converter. In this case, the power to which the DC-to-AC converter is derated can for its part be variable dynamically. Thus, by virtue of the method according to the disclosure, regulation power can also be provided by the inverter despite the variation in the power of the at least one other DC source.

In one embodiment, the at least one DC source has a photovoltaic generator, which is connected to the DC link of the DC-to-AC converter via the actuable DC-to-DC converter. A photovoltaic generator can be varied in terms of its power very quickly by virtue of its operating point being shifted by the DC-to-DC converter. Thus, very high dynamics are possible when compensating for the variation in the power of the at least one other DC source. In particular, these dynamics are much greater than, for example, in the case of a generator comprising an electric machine as DC source, in which the moment of inertia of a rotor of the electric machine is already in opposition to higher dynamics during changing of the output power.

For a high dynamic power, it is advantageous if a plurality of DC sources each have a photovoltaic generator, which is connected to the DC link of the DC-to-AC converter via an actuable DC-to-DC converter, with which DC-to-DC converter an MPP tracking for the respective photovoltaic generator is also possible. The inverter in the method according to the disclosure can also be a multistring inverter, in which all of the DC sources each have at least one string of photovoltaic cells and in each case, or nevertheless at least apart from one, are connected to the common DC-to-AC converter via an actuable input-side DC-to-DC converter. The operating point of a DC source which is connected to the DC link directly or via a DC-to-DC converter with a fixed transformation ratio can be varied by varying the DC-link voltage using the DC-to-AC converter of the inverter.

The at least one other DC source, whose power variation is compensated for by actuation of the DC-to-DC converter assigned to the at least one DC source, can also have a generator comprising an electric machine, however. This generator can be connected to the DC link of the DC-to-AC converter without a DC-to-DC converter which is actuable in order to cause a change in the power fed into the DC link by the at least one other DC source. If the generator is an AC generator, said AC generator is combined in the DC source with a downstream AC-to-DC converter. Specifically, the at least one other DC source may be, for example, a wind turbine or a diesel generator, which themselves only have low dynamics of the power that can be provided thereby. By combining with the at least one highly dynamic DC source on the basis of a photovoltaic generator, this deficiency is eliminated in the method according to the disclosure, however.

It goes without saying that the power output by each DC source is detected in the method according to the disclosure in order to be able to implement the power compensation between the DC sources. It furthermore goes without saying that the power of the DC sources is detected at at least the same rate at which there is a response, to react with the aid of the at least one DC-to-DC converter, to the variations in the power of the at least one other DC source. In one embodiment, the sampling rate at which the power of the DC sources is detected is even higher, for example twice as great. The sampling rate or measuring frequency can be more than 100, more than 1000 or else more than 10,000 Hz. A typical rate at which the power of the DC sources is detected is in the range of from 8 to 50 kHz. The rate at which the power of the at least one DC source is adjusted by actuation of the at least one DC-to-DC converter in order to respond to variations in the power of the at least one other DC source, on the other hand, is more than 10 Hz, or more than 100 Hz or at least 1,000 Hz. Specifically, it is presently in a range of from 4 to 25 kHz. This corresponds to a response time of the at least one DC-to-DC converter to variations in the power of the at least one other DC source of from 40 to 250 µs. Even a rate of more than 10 Hz already corresponds to a response time of less than 100 ms, and therefore less than half the conventionally allowed conversion time of an inverter connected to an AC grid in response to a sudden reduction in the AC power of 200 ms. In general, it should be stated that the quality and robustness of the method according to the disclosure increases as the measurement frequency increases and as the response time of the at least one DC-to-DC converter to variations in the power of the at least one other DC source decreases.

The power of the DC-to-AC converter is typically derated in accordance with external presets, wherein these presets can be preset by the respective operator of the grid into which the DC-to-AC converter feeds, explicitly or by parameters of the grid. The distribution of the power among the individual DC sources then takes place dynamically within the method according to the disclosure, i.e. in accordance with internal presets.

In the method according to the disclosure, the variation in the power of the at least one other DC source can be caused by variations in the operating conditions of the other DC source, such as, for example, a photovoltaic generator or a wind turbine. In various embodiments of the method according to the disclosure, the power of the at least one other DC source is varied intentionally, i.e. actively, however, in order to use in a targeted manner the time for the deration of the power of the DC-to-AC converter.

This includes in particular that at least part of the characteristic of the DC sources, i.e. in the case of a multistring inverter all of the strings connected to the DC link via in each case one DC-to-DC converter or all of the strings connected to the DC link directly, is detected in order to detect the MPP thereof during derated operation as well. In this case, the aim of this detection can be the determination of the present maximum available power in order to demand a remuneration for this. However, the aim may also be to be able to run up the respective MPP directly after the deration. This can also be considered to be a measure to maximize the feed-in power, in this case directly after the deration.

In order to detect the MPP of a DC source, said MPP is in one embodiment run up directly. In order to discover it it is expedient to run down the characteristic of the respective DC source as completely as possible. The variation in the power of the respective DC source occurring in the process is compensated for dynamically in accordance with the disclosure by suitable actuation of the at least one DC-to-DC converter.

By running down the characteristic during deration, it is also possible to identify which of the DC sources connected to the DC link are voltage-extending, i.e. have a present off-load voltage above the maximum permissible DC-link voltage. The operating voltage of these DC sources should be varied in the case of deration in the short-circuit direction instead of in the off-load direction in order to avoid a situation whereby the maximum permissible DC-link voltage is exceeded. This applies in particular in the case of a multistring inverter.

The method according to the disclosure not only allows the identification of voltage-extending DC sources, however, but also makes it possible to transfer said DC sources from an operating state close to off load into an operating state close to short circuit without needing to short circuit said DC sources. The higher power flowing in the meantime into the common DC link is compensated for dynamically by the at least one DC-to-DC converter.

The variation in the power of the at least one other DC source can also be performed from the point of view of finding an operating point for all of the DC-to-DC converters at which optimization of the operation of the inverter is provided from a superordinate point of view. Such a superordinate point of view may be, for example, minimized power losses in the entire inverter or else only all of the DC-to-DC converters. A matching of the power losses of individual DC-to-DC converters with one another can also be such a superordinate point of view. A further point of view would be a minimized loading of the components of the DC-to-DC converters and/or of the DC-to-AC converter or else an optimized regulation capacity of the power of the DC-to-AC converter in order to maximally exhaust the respectively valid upper limit of the power of the DC-to-AC converter.

As has already been indicated, an inverter according to the disclosure comprising a DC-to-AC converter having an input-side DC link, comprising a plurality of inputs for a parallel connection of a plurality of DC sources to the DC link, comprising at least one DC-to-DC converter, which is arranged between one of the inputs and the DC link and is actuable in order to cause a change in the power fed via said DC-to-DC converter into the DC link, and comprising a control device is characterized by the fact that its control device actuates the at least one DC-to-DC converter in accordance with the method according to the disclosure. In this case, the control device can comprise a primary control device, which regulates the power of the DC-to-AC converter in accordance with external presets, and a secondary control device, which distributes this power dynamically among the individual inputs for the DC sources, with actuation of the at least one DC-to-DC converter. For this purpose, actuable DC-to-DC converters are provided in all inputs. In the case of one of the inputs, however, an actuable DC-to-DC converter can be dispensed with since the DC-link voltage can be varied by the DC-to-AC converter in order to vary the operating point of the DC source connected to this input. In this case, dispensing with an actuable DC-to-DC converter can mean both that no DC-to-DC converter is provided at all and also that a DC-to-DC converter with a fixed transformation ratio is provided.

In an operating mode without deration of the power of the DC-to-AC converter, the control device can actuate the DC-to-DC converters and possibly the DC-to-AC converter for individual MPP tracking of the connected DC sources. This applies in particular in the case of the formation of individual, a plurality of or all of the DC sources as photovoltaic generators and particularly in the case of a multistring inverter according to the disclosure.

Advantageous developments of the disclosure are set forth in the patent claims, the description and the drawings. The advantages of features and of combinations of a plurality of features mentioned in the description are merely by way of example and can take effect alternatively or cumulatively without the advantages necessarily needing to be achieved by embodiments in accordance with the disclosure. Without the subject matter of the attached patent claims being altered hereby, the following applies in respect of the disclosure content of the original application documents and the patent: further features can be gleaned from the drawings, in particular the illustrated relative arrangement and interactive connection of a plurality of component parts with respect to one another. The combination of features of different embodiments of the disclosure or of features of different patent claims departing from the selected back-references of the patent claims is likewise possible and is suggested hereby. This also relates to those features which are illustrated in separate drawings or are mentioned in the description thereof. These features can also be combined with the features of different patent claims. Likewise, features listed in the patent claims can be dispensed with for further embodiments of the disclosure.

The features mentioned in the patent claims and the description should be understood in respect of their number such that precisely this number or a greater number than the mentioned number is provided, without the explicit use of the adverb "at least" being required. If, therefore, the discussion refers to one element, for example, this should be understood to mean that precisely one element, two elements or more elements are provided. These features can be supplemented by other features or can be the only features from which the respective product consists.

The reference symbols contained in the patent claims in no way restrict the scope of the subjects protected by the patent claims. They merely serve the purpose of making the patent claims more easily understandable.

BRIEF DESCRIPTION OF THE DRAWINGS

The disclosure will be explained and described in more detail below on the basis of exemplary embodiments with reference to the attached drawings.

DETAILED DESCRIPTION

The disclosure relates to a method for distributing power among a plurality of DC sources, which are connected in parallel to an input-side DC link of a DC-to-AC converter, which method has the features of the preamble of independent patent claim 1. Furthermore, the disclosure relates to an inverter, which has a DC-to-AC converter comprising an input-side DC link, a plurality of inputs for a parallel connection of a plurality of DC sources to the DC link, and at least one DC-to-DC converter, which is arranged between one of the plurality of inputs and the DC link and is actuable in order to cause a change in the power fed via said DC-to-DC converter into the DC link.

In particular, a plurality of or all of the DC sources can comprise a photovoltaic generator having at least one string of photovoltaic cells. If all of the DC sources are designed in this way, a corresponding inverter is also referred to as a photovoltaic inverter. If, in addition, the operating point of all of the DC sources can be set individually by actuating corresponding DC-to-DC converters, the term multistring inverter is used. A string of photovoltaic cells is in this case understood to mean at least a series circuit of a multiplicity of photovoltaic cells. However, a plurality of such series circuits can also be connected in parallel in a string. In this case, each of these parallel-connected series circuits is referred to as a substring. The photovoltaic cells can in this case be combined in groups to form photovoltaic modules, which are then for their part connected in series to form a string or substring.

The deration of the power of inverters with which photovoltaically generated electrical energy is fed into an AC grid can be required for stabilization of the AC grid. The deration can take place to a fixed percentage, i.e. a percentage which is constant over time for a certain period of time, of the rated power of the respective inverter. However, it can also take place dynamically, i.e. taking into consideration a preset directed to the instantaneous power requirement on the AC grid on the basis of limit values which vary over time. In any case, the deration provides negative regulating power for the AC grid.

Irrespective of whether the deration takes place dynamically or rather statically and the reason for which the deration is performed, the present disclosure is concerned with distributing the derated power of the DC-to-AC converter among the various DC-to-DC converters of the inverter.

Figure 1:
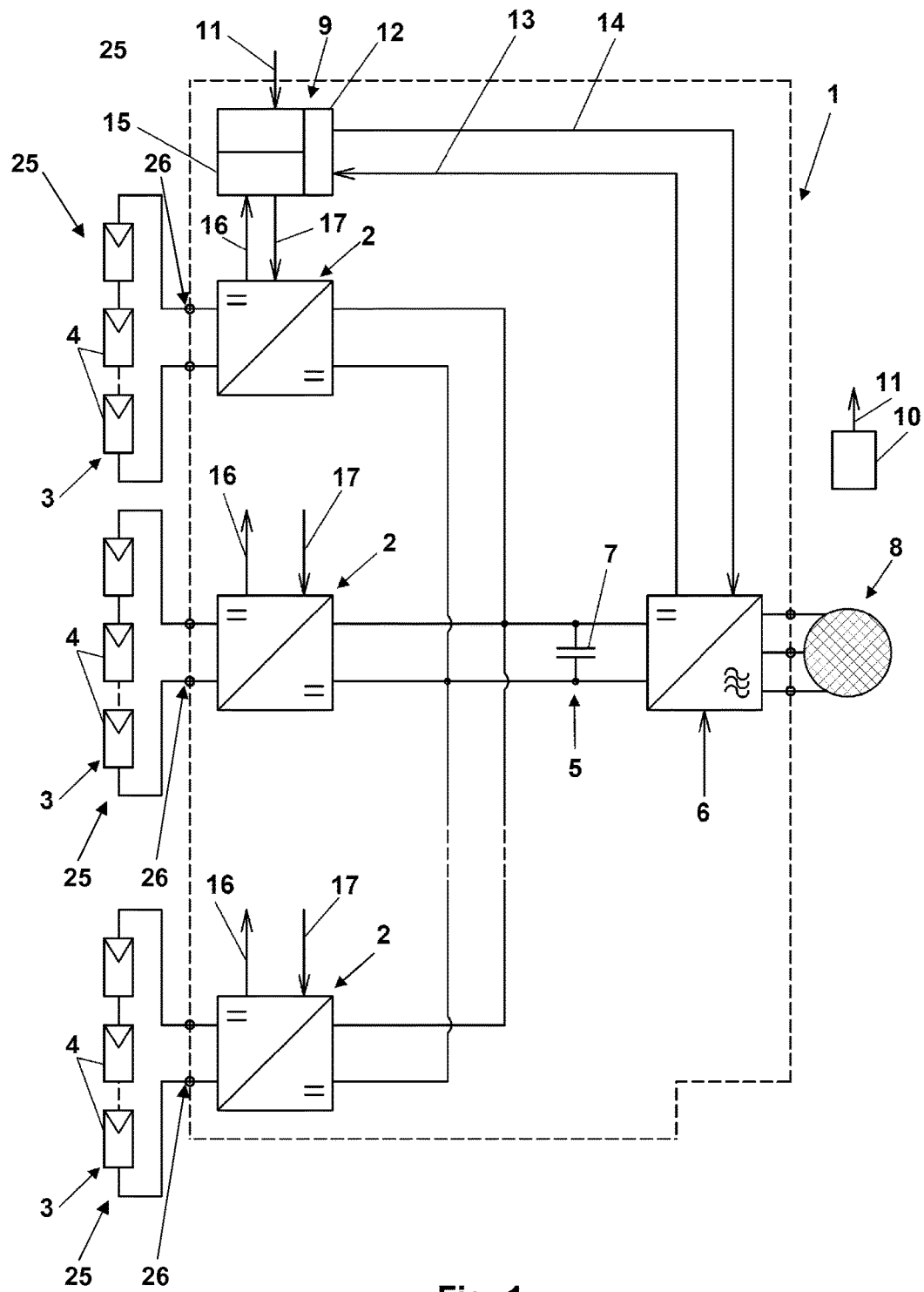
FIG. 1 shows a simplified circuit diagram of a first embodiment of the inverter according to the disclosure.

FIG. 1 shows the basic design of an inverter 1. The inverter 1 comprises a plurality of two-pole inputs 26, to which in each case a DC-to-DC converter 2, typically a boost converter, is connected. A DC source 25 is connected to a common DC link 5 via each of the inputs 26. Each DC source 25 has at least one string 3 of photovoltaic cells 4. The DC link 5 is the input DC link of a common DC-to-AC converter 6. The number of photovoltaic cells 4 of each string 3 can be much greater than is illustrated here. Each string 3 can also comprise a plurality of substrings connected in parallel. The number of inputs 26 can likewise be greater than is illustrated here. However, it is also possible for only two inputs 26 to be provided. The DC-to-DC converters 2 are typically boost converters, with which, despite a uniform DC-link voltage across a DC-link capacitor in the DC link 5, each string 3 can be operated at an individual operating voltage in order to obtain the maximum electric power of the string 3 under the present operating conditions. This electric power is provided to the DC-to-AC converter 6 via the DC link 5, and said DC link feeds said power as alternating current into an external AC grid 8. The DC-to-AC converter 6 and the DC-to-DC converters 2 are controlled by a control device 9. If an operator 10 of the AC grid 8 transmits a deration signal 11, which is received by the control device 9, the control device 9 derates the DC-to-AC converter 6 correspondingly using a control device element 12. In this case, said control device receives a power signal 13 describing the present power of the DC-to-AC converter 6 and transmits an actuation signal 14 to the DC-to-AC converter 6. It goes without saying that the signals 13 and 14 can be combined from different partial signals, for example from a current measurement and a voltage measurement in the case of the signal 13 and from a plurality of actuation signals for the individual semiconductor switches of the DC-to-AC converter 6 in the case of the signal 14. The control device 9 distributes the derated power among the individual DC-to-DC converters 2 via a further control device element 15 and also in the process receives power signals 16 and outputs actuation signals 17. In this case, the actuation signals 17 are generated depending on the power signals 16 in such a way that the sum of the powers of the DC-to-DC converters 2 which flow into the DC link 5 correspond to the derated power fed into the AC grid 8 by the DC-to-AC converter 6. Variations in the power of one of the DC-to-DC converters 2 are compensated for by opposing variations in the powers of at least one other DC-to-DC converter 2, so that the derated power of the DC-to-AC converter 6 is always available in the DC link 5 and therefore the maximum permissible power can be fed into the AC grid 8. This applies both in the case of regulation of the power of the DC-to-AC converter 6 to a fixed value, such as, for example, a certain percentage of the rated power of the DC-to-AC converter 6, and in the case of regulation to limit values which vary over time, which are determined on the basis of the instantaneous power demand of the AC grid 8. In this case, in particular the latter case corresponds to a provision of regulating power for the AC grid 8 with the aid of the DC-to-AC converter 6, i.e. a dynamic variation in the power fed into the AC grid 8 by the DC-to-AC converter 6 in accordance with external presets.

Although a three-phase inverter is illustrated in FIG. 1, the use of a single-phase or two-phase inverter is also possible.

Figure 2:
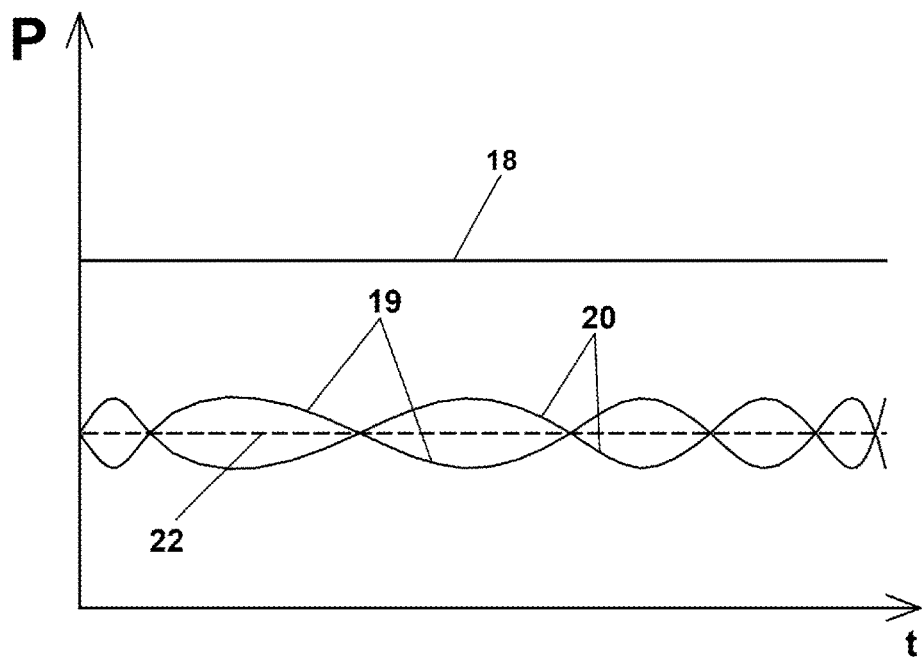
FIG. 2 shows the power plotted over time for two DC-to-DC converters of an inverter given a constant power of a common DC-to-AC converter of the inverter.

FIG. 2 illustrates, for an inverter comprising two DC-to-DC converters and a common DC-to-AC converter, how a constant power 18, which is fed into an AC grid 8 by the DC-to-AC converter, is distributed dynamically among the powers 19 and 20 of the two DC-to-DC converters 2 and the DC sources 25 connected via said DC-to-DC converters to the DC link 5 shown in FIG. 1. A variation in the power 19 of one DC-to-DC converter is compensated for by an opposite variation in the power 20 of the other DC-to-DC converter. In this case, this dynamic compensation takes place with a fast response time in the region below 10 ms, for example, in the region of 1 ms or less. Thus, despite the variation in the power 19 of one DC-to-DC converter, the voltage across the DC-link capacitor 7 shown in FIG. 1, the power 18 which is fed into the AC grid 8 by the DC-to-AC converter, and therefore also an average power 22 of all of the DC sources 25 and, in this case equivalent thereto, an average power 22 of the DC-to-DC converter 2 connected thereto can be kept constant. The average power 22 of the DC sources 25 should in this context and below be understood to mean the average contribution of each of the DC sources 25 in total connected to the inverter 1 to the power 18 of the DC-to-AC converter 6. This condition also applies in particular in time-dependent fashion, i.e. the average power 22 of each DC-to-DC converter 2 results at any time t from the quotient of the power 18 of the DC-to-AC converter 6 and the number of DC-to-DC converters 2 to be assigned in total to the inverter 1. Since in the present case the inverter is an inverter comprising in total two DC-to-DC converters 2, the average power 22 of these two DC-to-DC converters 2 is half the power 18 of the DC-to-AC converter 6.

In the case illustrated, the powers 19, 20 of one DC-to-DC converter and the other DC-to-DC converter, apart from the compensation in accordance with the disclosure, are at the same level of average power 22. However, it is also possible for the power 19 of one DC-to-DC converter and the power 20 of the other DC-to-DC converter 2 to be at different levels. For example, the power 19 of one DC-to-DC converter 2 can be a certain magnitude or percentage greater than the power 20 of the other DC-to-DC converter 2, without the compensation in accordance with the disclosure, or vice versa. It is essential that in each case the sum of the powers of all the DC sources 25 connected to the inverter 1 corresponds to the preset power 18 of the DC-to-AC converter 6.

Figure 3:
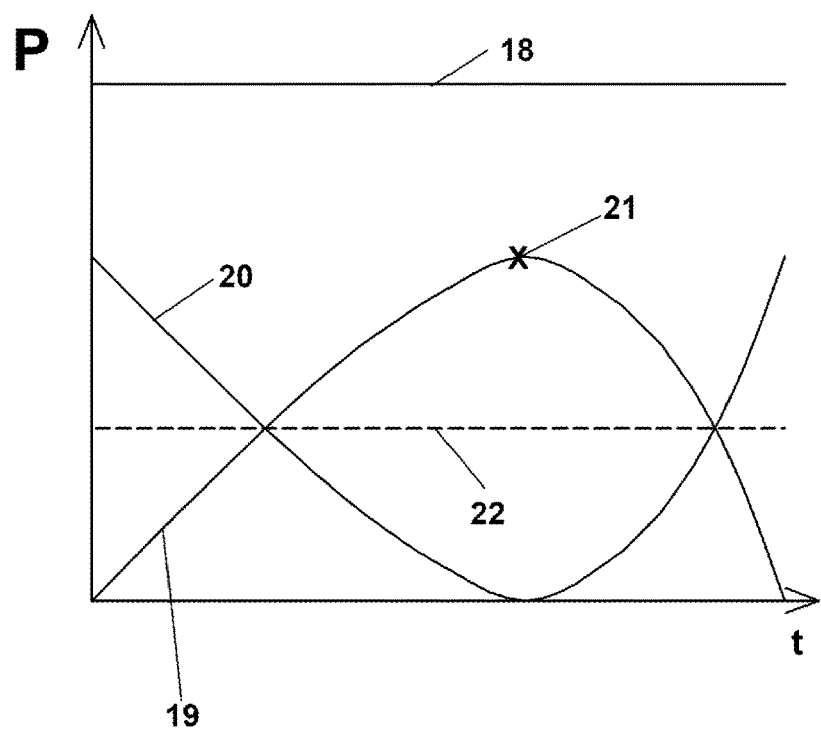
FIG. 3 shows the power plotted over time for three DC-to-DC converters of an inverter as shown in FIG. 1, wherein the characteristic of the strings connected to one of the two DC-to-DC converters is run down, which is compensated for by another one of the DC-to-DC converters.

FIG. 3 illustrates profiles of the power P over time t for an inverter comprising three DC-to-DC converters 2 and a common DC-to-AC converter 6 as shown in FIG. 1. The power 18 of the DC-to-AC converter 6 is constant over time and is derated with respect to the maximum power available at the DC-to-DC converters. The power 19 of one DC-to-DC converter corresponds to its characteristic versus its operating voltage, which has been increased over time t at a constant rate. That is to say that although the DC-to-DC converters 2 do not feed the maximum powers available from the strings connected thereto into the common DC link 5, during the deration of the power 18, the MPPs 21 of the individual DC-to-DC converters 2 or of the strings 3 connected thereto are detected. This can take place once with the aim of documenting the maximum available power for the demand for remuneration. Another aim may be to be able to run up the MPPs immediately again as soon as the deration of the power 18 has come to an end. A passing through the MPP 21 from a range of high operating voltages close to off-load into a range of low operating voltages close to short circuit can additionally take place with the aim of transferring a string 3 which, as part of the deration, comes close to a voltage extension, i.e. a higher operating voltage than the maximum permissible DC-link voltage across the DC-link capacitor 7 of the common DC link 5, to an operating point which is closer to short circuit with approximately the same power, but a lower operating voltage. The power 19 which is increased in the process at the MPP 21 of one DC-to-DC converter is compensated for by a reduced power 20 of one of the other two DC-to-DC converters 2. Therefore no interruption of the feed of power 18 is necessary, which would be associated with a feed-in loss beyond the deration forced externally. The remaining other DC-to-DC converter 2 has, in this example, a power which is equal to the average power 22. The average power 22 of all the DC-to-DC converters 2 in this case remains constant over time since the power 18 of the DC-to-AC converter 6 is also constant over time in the illustrated range. Since in this example the inverter is a multistring inverter comprising in total three DC-to-DC converters, the average power 22 of the DC-to- DC converters corresponds to a third of the power 18 of the DC-to-AC converter 6. It is also possible for the power 18 of the DC-to-AC converter to follow a preset, time-variable setpoint curve. In this case, too, it is essential that the powers of all of the DC sources 25 connected to the inverter 1 add up to the preset power 18 of the DC-to-AC converter 6 at any time t.

Figure 4:
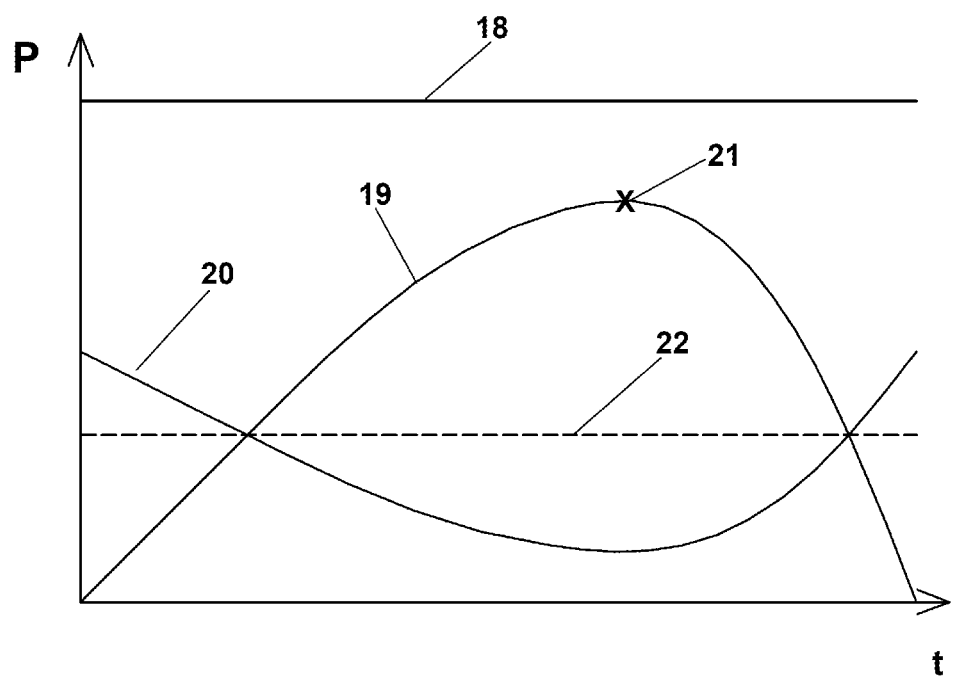
FIG. 4 shows the power plotted over time for three DC-to-DC converters of an inverter as shown in FIG. 1, wherein the characteristic of the strings connected to one of the two DC-to-DC converters is run down, which is compensated for by the two other DC-to-DC converters.

FIG. 4 illustrates similar power profiles to those shown in FIG. 3. However, in this case the power 19 of one DC-to-DC converter 2 or of the strings 3 connected thereto, which power passes through the MPP 21, in contrast to FIG. 3, is not only compensated for by an opposite variation in the power 20 of another DC-to-DC converter 2. Instead, the opposite variation is in this case distributed among a plurality of, in this case two, other DC-to-DC converters 2 with correspondingly reduced powers 20. The variation in the powers 20 with respect to an average power 22 of all of the DC-to-DC converters 2 is therefore only half as great as the variation in the power 19 with respect to the average power 22. Thus, it may also be possible, for example, when all of the strings are already operating at a relatively high operating voltage, for the temporary power increase to be compensated for by the other DC-to-DC converters when the first string arriving in the voltage-extending range is transferred to low operating voltages close to short circuit. This is only possible with difficulty, but sometimes even not at all, in the case of an inverter 1 comprising only two DC-to-DC converters 2 since in this case a change in power of one string 3 alone needs to be compensated for by an opposite change in power of the precisely one other string 3. The degree of freedom for an active power change of an individual DC-to-DC converter 2 or of the strings 3 connected thereto therefore increases with the number of DC sources 25 connected in total to the inverter 1. For the degree of freedom of a dynamic power change, in this case the DC-to-DC converters 2 present within the inverter 1 are important.

By virtue of the power being redistributed dynamically between the individual DC-to-DC converters 2 as shown in FIG. 1 as part of a search or tracking method, an operating point of the entire inverter 1 can also be determined empirically by virtue of particularly good account being taken of a superordinate point of view. This superordinate point of view may be, for example, minimized power losses, a minimized component loading or a maximized, i.e. quick and anyhow stable regulation capacity of all of the powers. Such a superordinate point of view can also be the matching of the power losses of individual DC-to-DC converters 2 to one another in respect of uniform loading of their components during operation. In this way, in particular the lives of individual components to be expected in different DC-to-DC converters 2 can be matched. Premature failure of individual components of a DC-to-DC converter in comparison with components of identical design of another DC-to-DC converter is thus effectively prevented.

Figure 5:
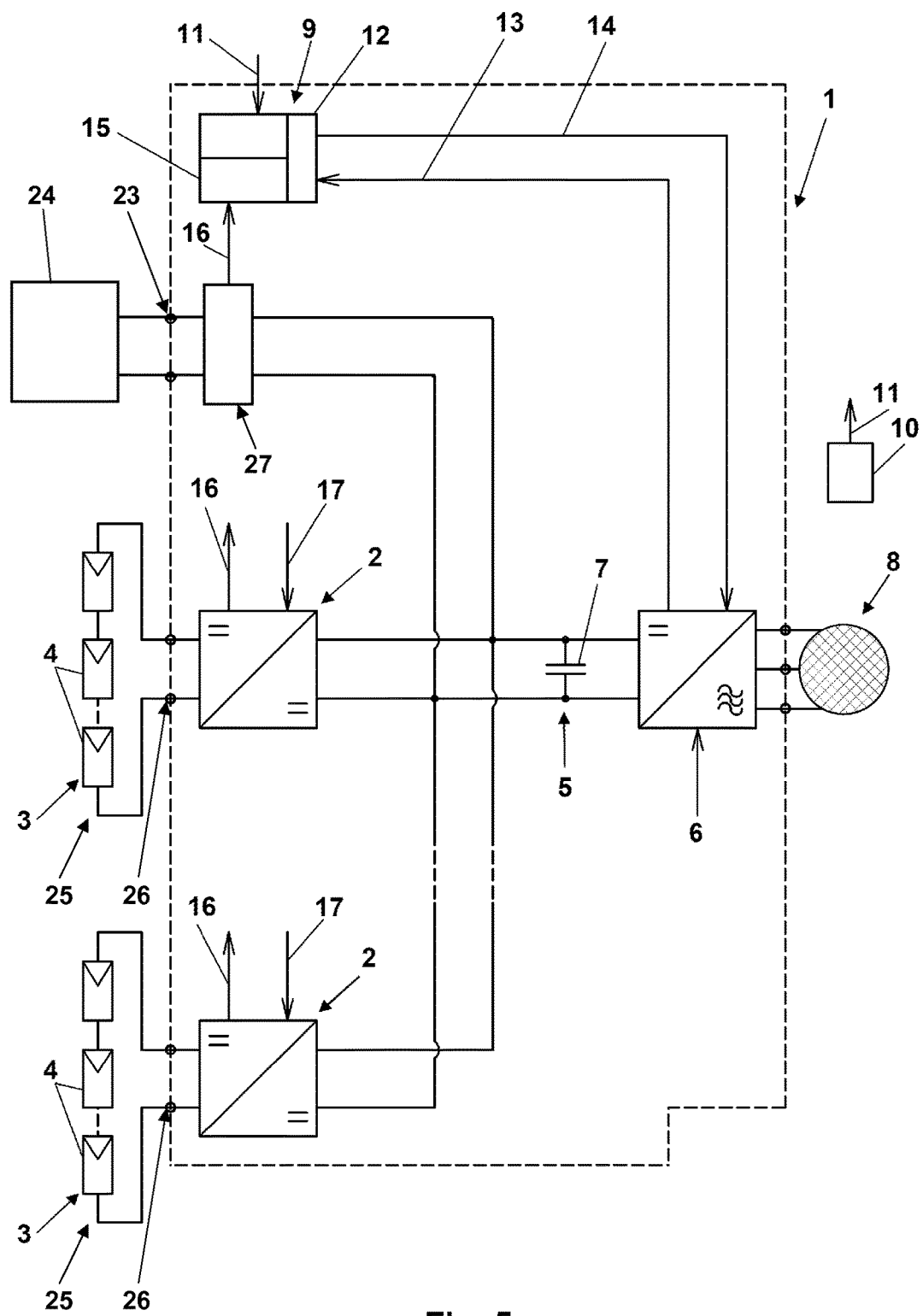
FIG. 5 shows a simplified circuit diagram of a further embodiment of the inverter according to the disclosure.

FIG. 5 shows an inverter 1, which differs from the inverter 1 shown in FIG. 1 in terms of the following details. In addition to the inputs 26 with the actuable DC-to-DC converters 2, the inverter 1 has a further two-pole input 23, via which a DC source 24 is connected directly to the common DC link 5. In this case, the current flowing from the DC source 24 into the DC link 5 is detected in the input 23 exclusively by a current sensor 27 and communicated to the control device 9 as power signal 16. The specific power in this case results together with the DC-link voltage of the DC link 5, which is contained in the power signal 13 of the DC-to-AC converter 6. The DC source 24 can have, instead of a photovoltaic generator, in particular a generator comprising an electric machine. The electric machine can in this case be driven, for example, by a wind turbine or a diesel engine. Such DC sources are also referred to as wind turbines or diesel generators. A DC source can also comprise an AC generator, with an AC-to-DC converter connected downstream thereof. DC sources which have a generator comprising an electric machine are on their own less dynamic owing to the moment of inertia of their rotor, which also concerns deliberate variations in their powers which they feed into the DC link 5. They are therefore less suitable as the only current sources if the power of the DC-to-AC converter 6 is intended to be varied dynamically in order to provide regulation power for the AC grid 8. These dynamics are achieved in the case of the inverter 1 shown in FIG. 5 by the DC sources 25 connected in parallel in each case by means of an actuatable DC-to-DC converter 2 to the common DC link 5 in the form of strings 3 or photovoltaic generators, however. However, a further photovoltaic generator in the form of a string 3 could also be connected to the input 23 without any actuable DC-to-DC converters 2. In the case of this photovoltaic generator, despite the actuable DC-to-DC converter 2 which is not provided in the input 23, MPP tracking could then be implemented. For this purpose, the DC-link voltage which forms as a voltage drop across the DC-link capacitor 7 of the DC link 5 would need to be varied by targeted actuation of the DC-to-AC converter 6. Even in the case of any other DC source 24, the operating point thereof can in this way be varied by the inverter 1 shown in FIG. 5. Any resultant variation in the power which is fed by the DC source 24 into the DC link 5 is compensated for dynamically by actuation of the actuable DC-to-DC converters 2 in order to cause complementary power variations.

The invention claimed is:

1. A method for distributing power among a plurality of DC sources, which are connected in parallel to an input-side DC link of a DC-to-AC converter, of which DC sources at least one is connected, via a DC-to-DC converter, to the DC link, wherein the DC-to-DC converter is actuable in order to cause a change in the power fed into the DC link by the DC source, comprising:

derating powers of the DC sources differently during a derated operation of the DC-to-AC converter that includes a reduction of power at the DC-to-AC converter from an initial power to a derated power in which the power of the DC-to-AC converter is derated with respect to the sum of the maximum powers available from all DC sources;

dynamically compensating a variation in the power of at least one other DC source during the derated operation of the DC-to-AC converter by actuating at least the at least one DC-to-DC converter via which the at least one DC source is connected to the DC link to maintain a sum of powers of the DC sources constant at the derated power during the derated operation, wherein the power of the at least one other DC source is varied actively by virtue of a DC-to-DC converter via which the at least one other DC source is connected to the DC link being actuated.

2. The method as claimed in claim 1, wherein the at least one DC source comprises a photovoltaic generator, which is connected to the DC link of the DC-to-AC converter via the actuable DC-to-DC converter.

3. The method as claimed in claim 2, wherein a plurality of DC sources each comprise a photovoltaic generator, which is connected to the DC link of the DC-to-AC converter via an actuable DC-to-DC converter.

4. The method as claimed in claim 1, wherein the at least one other DC source comprises a generator comprising an electric machine.

5. The method as claimed in claim 1, wherein the variation in the power of the at least one other DC source is compensated for with a response time of no more than 10 ms of the DC-to-DC converter via which the at least one DC source is connected to the DC link.

6. The method as claimed in claim 1, wherein the power of the DC-to-AC converter is derated in accordance with external presets.

7. The method as claimed in claim 1, wherein the derated power of the DC-to-AC converter is varied dynamically.

8. A method for distributing power among a plurality of DC sources, which are connected in parallel to an input-side DC link of a DC-to-AC converter, of which DC sources at least one is connected, via a DC-to-DC converter, to the DC link, wherein the DC-to-DC converter is actuable in order to cause a change in the power fed into the DC link by the DC source, comprising:
   derating powers of the DC sources differently during a derated operation of the DC-to-AC converter that includes a reduction of power at the DC-to-AC converter from an initial power to a derated power in which the power of the DC-to-AC converter is derated with respect to the sum of the maximum powers available from all DC sources;
   dynamically compensating a variation in the power of at least one other DC source during the derated operation of the DC-to-AC converter by actuating at least the at least one DC-to-DC converter via which the at least one DC source is connected to the DC link to maintain a sum of powers of the DC sources constant at the derated power during the derated operation,
   wherein the power of the at least one other DC source is varied actively by virtue of the DC-to-AC converter being actuated in order to cause a change in a DC-link voltage of its input-side DC link.

9. The method as claimed in claim 1, wherein the power of the at least one other DC source is varied actively in order to detect at least a part of a characteristic of the at least one other DC source.

10. The method as claimed in claim 1, wherein, during the variation of the power of the at least one other DC source, an MPP of the at least one other DC source is passed through.

11. The method as claimed in claim 1, wherein the power of the at least one other DC source is varied actively in order to identify a voltage extension of the at least one other DC source.

12. The method as claimed in claim 1, wherein the power of the at least one other DC source is varied actively in order to transfer the at least one other DC source from an operating point close to off load to an operating point close to short circuit of the same power, but a lower operating voltage.

13. The method as claimed in claim 1, wherein the power of the at least one other DC source is varied actively in order to determine and approach an operating point of all of the DC sources which is optimized from at least one point of view.

14. The method as claimed in claim 13, wherein the point of view is selected from the following:
   minimized power losses of all of the DC-to-DC converters and the DC-to-AC converter,
   a minimized loading of all of the DC-to-DC converters and the DC-to-AC converter,
   a matching of the power losses of components with an identical design within a plurality of the DC-to-DC converters,
   an optimized power regulation capacity of the DC-to-AC converter.

15. An inverter, comprising:
   a DC-to-AC converter having an input-side DC link,
   a plurality of inputs for a parallel connection of a plurality of DC sources to the DC link,
   at least one DC-to-DC converter, which is arranged between one of the inputs and the DC link and is actuable in order to cause a change in the power fed via said DC-to-DC converter into the DC link, and
   a control device which actuates the at least one DC-to-DC converter in accordance with a method, comprising:
      derating powers of the DC sources differently during a derated operation of the DC-to-AC converter that includes a reduction of power at the DC-to-AC converter from an initial power to a derated power in which the power of the DC-to-AC converter is derated with respect to the sum of the maximum powers available from all DC sources; and
      dynamically compensating a variation in the power of at least one other DC source during the derated operation of the DC-to-AC converter by actuating at least the at least one DC-to-DC converter via which the at least one DC source is connected to the DC link to maintain a sum of powers of the DC sources constant at the derated power during the derated operation,
      wherein the power of the at least one other DC source is varied actively by virtue of a DC-to-DC converter via which the at least one other DC source is connected to the DC link being actuated.

16. The inverter as claimed in claim 15, wherein the control device has a primary control device element, which regulates the power of the DC-to-AC converter, and a secondary control device element, which distributes this power among the inputs by actuation of the at least one DC-to-DC converter.

17. The inverter as claimed in claim 15, further comprising actuable DC-to-DC converters provided between all of the inputs and the DC link.

18. The inverter as claimed in claim 15, wherein no actuable DC-to-DC converter is provided in at least one of the input.

* * * * *